United States Patent [19]

Mage

[11] Patent Number: 4,875,853
[45] Date of Patent: Oct. 24, 1989

[54] METHOD AND APPARATUS FOR CHARRING MATERIAL

[76] Inventor: Jacques Mage, 233 Rue Paul Doumer, 78510 Triel/Seine, France

[21] Appl. No.: 300,703

[22] Filed: Jan. 23, 1989

Related U.S. Application Data

[63] Continuation of Ser. No. 850,234, Apr. 11, 1986, abandoned.

[51] Int. Cl.$^4$ .............................................. F27D 1/08
[52] U.S. Cl. ................................. 432/100; 432/456; 432/157; 432/250; 432/152
[58] Field of Search ............... 432/156, 157, 100, 250, 432/144, 152

[56] References Cited

U.S. PATENT DOCUMENTS

| | | | |
|---|---|---|---|
| 987,793 | 3/1911 | Buess | 432/157 |
| 2,503,788 | 4/1950 | White | 432/100 |
| 3,171,795 | 3/1965 | Fagnant | 432/100 |
| 3,294,505 | 12/1966 | Garrison | 432/100 |
| 3,692,285 | 9/1972 | Aveny | 432/100 |
| 3,958,936 | 5/1976 | Knight, Jr. | 432/156 |
| 4,389,191 | 6/1983 | Lowe | 432/250 |

*Primary Examiner*—Henry C. Yuen
*Attorney, Agent, or Firm*—Reed Smith Shaw & McClay

[57] ABSTRACT

Oven for charring plant matter, downdraft intermittent operation type, without external energy source. The invention relates essentially to the arrangement of the hearth located at the bottom of the oven, which provides the mechanical stability of the whole, the distribution of fresh air by means of a device permitting the circulation of air on the inside, as well as the precise control of its admission and airtight sealing at the end of the cycle; the collection of gases and pyroligneous liquors by means of an annular collector terminating in a single flue. The pyroligneous liquors are collected at the bottom of the flue. A condenser maybe installed to recover tars or to provide complete processing of the gases. Removal of the charcoal by gravity through a central opening, the cover of which contains the closable lighting aperture.

17 Claims, 5 Drawing Sheets

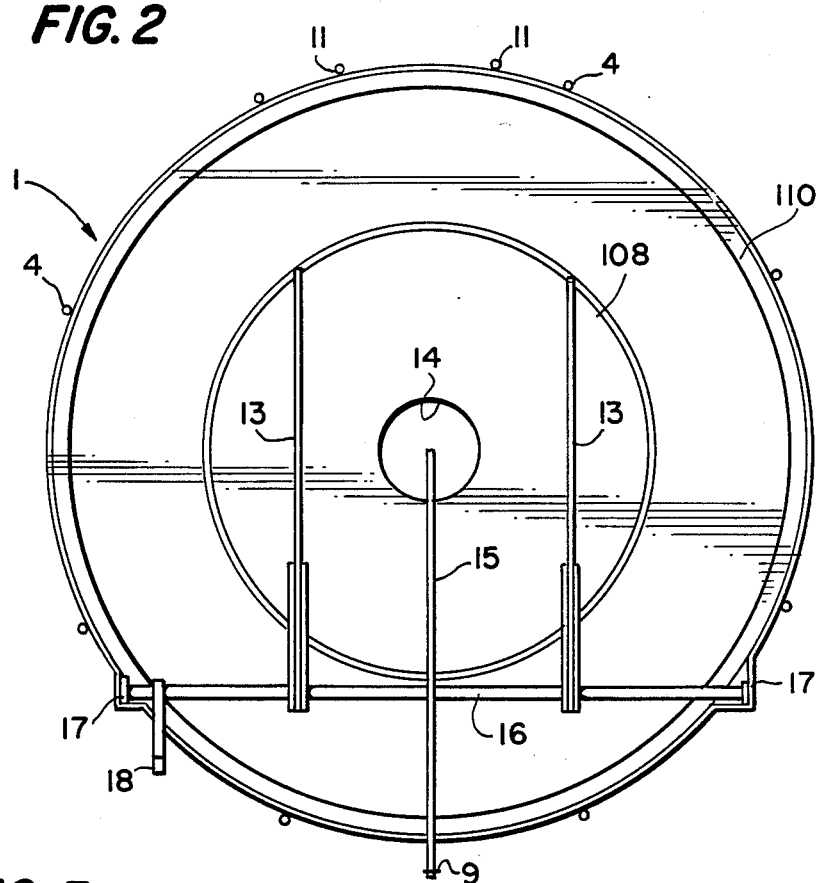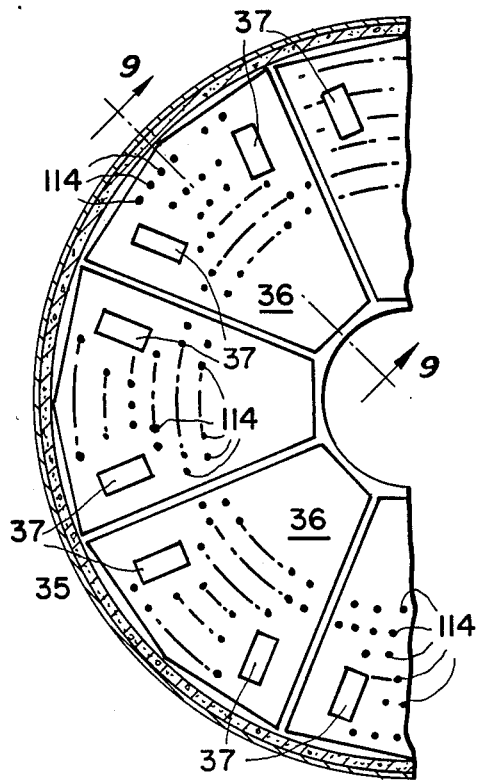

METHOD AND APPARATUS FOR CHARRING MATERIAL

This application is a continuation of application Ser. No. 850,234, filed Apr. 11, 1986, abandoned.

BACKGROUND AND DISCUSSION OF THE INVENTION

Methods and devices for charring plant matter may be grouped into two broad categories: first, industrial ovens with a large production capacity, which are highly sophisticated and involve the mobilization of significant financial and human resources. In the second group are ovens based on the ancient kiln, which operate without any outside energy source. The latter are used in almost all small and medium production units. However, their operation involves a number of disadvantages, and they permit neither the processing of gases nor the recovery of tars.

Many of the problems associated with methods and devices discussed above have been overcome by the invention described. This invention relates to an oven for charring wood and plant matter of the "downdraft intermittent operation" type, not requiring any outside energy source. It includes a series of innovations that facilitate handling and permit exact adjustment and a high degree of reliability. It can be easily incorporated into a well-organized worksite, with excellent operating economy.

The apparatus includes a metal cylinder placed on four feet with a fireproof insulating layer, mechanically shielded, covering the entire inside wall. The circular upper cover, which is operated manually from the ground, permits loading and has a direct draft aperture, also operated from the ground. Within the oven above the bottom, a hearth composed of stationary metal plates is arranged for holding the wood. In this space a number of essential functions of the machine take place. Quick removal from the oven by simple gravity is facilitated. A central opening with a 60 cm diameter provides for the rapid fall of the charcoal. For this purpose a section of the hearth is provided with a removable cover.

The invention described herein also provides for the collection of gases, pyroligneous liquors, and tars. An annular space located around the central discharge opening provides for the collection of gases and other products coming from the interior of the oven and directs them toward the stack of the single flue.

Each exterior air intake consists of a pipe welded to the bottom of the oven. It can be closed by means of a metal disk applied by a center screwshaft, a wheel and a stationary clamp. Adjustment is therefore exact and tightness is assured at the end of the cycle. These intakes are arrranged at the periphery of the bottom of the oven. Each consists of a metal box covering the air intake pipe and includes two outlets punched with holes admitting fresh air into the oven above the hearth.

The hearth itself is made of plates reinforced by bending and punched with holes permitting the passage of gases from the oven into the space between the hearth and the bottom. Openings of variable height and width permit the access of these gases, liquors and tars into the annular space which directs them to the stack of the flue.

Because of the innovations described above, the oven works well in any small or medium facility, where it provides numerous advantages. It is easy to use and provides autonomous operation. The manner of sealing and operation provide a clean, dust-free workplace. The air flows can be controlled by exact, reliable adjustment. The oven is completely airtight at the end of the cycle and cools quickly. The charred material is of high quality with substantially no tars or toxic by-products. The oven is energy efficient since no external energy source is required. Collection of all by-products is readily achieved and the collected gases, tars can be treated by known methods. Certain condensers can be used without adaptation.

The above has been a brief discussion of some advantages of the invention and disadvantages of existing methods and apparatus. Additional advantages can be appreciated for the detailed description of the preferred embodiment which follows.

BRIEF DESCRIPTION OF THE DRAWINGS

FIG. 2 is a plan view of the oven as shown in FIG. 1.

FIG. 3 is a sectional view of FIG. 1 taken along lines 3—3.

FIG. 4 is a sectional view of FIG. 7 taken along line 4—4.

FIG. 8a is a cross-section of a portion of the oven as shown in FIG. 8 taken along lines 8a—8a.

FIG. 9a is a cross-section of the oven as shown in FIG. 9 taken along lines 9a—9a.

DETAILED DISCUSSION OF PREFERRED EMBODIMENT

Figure 1:
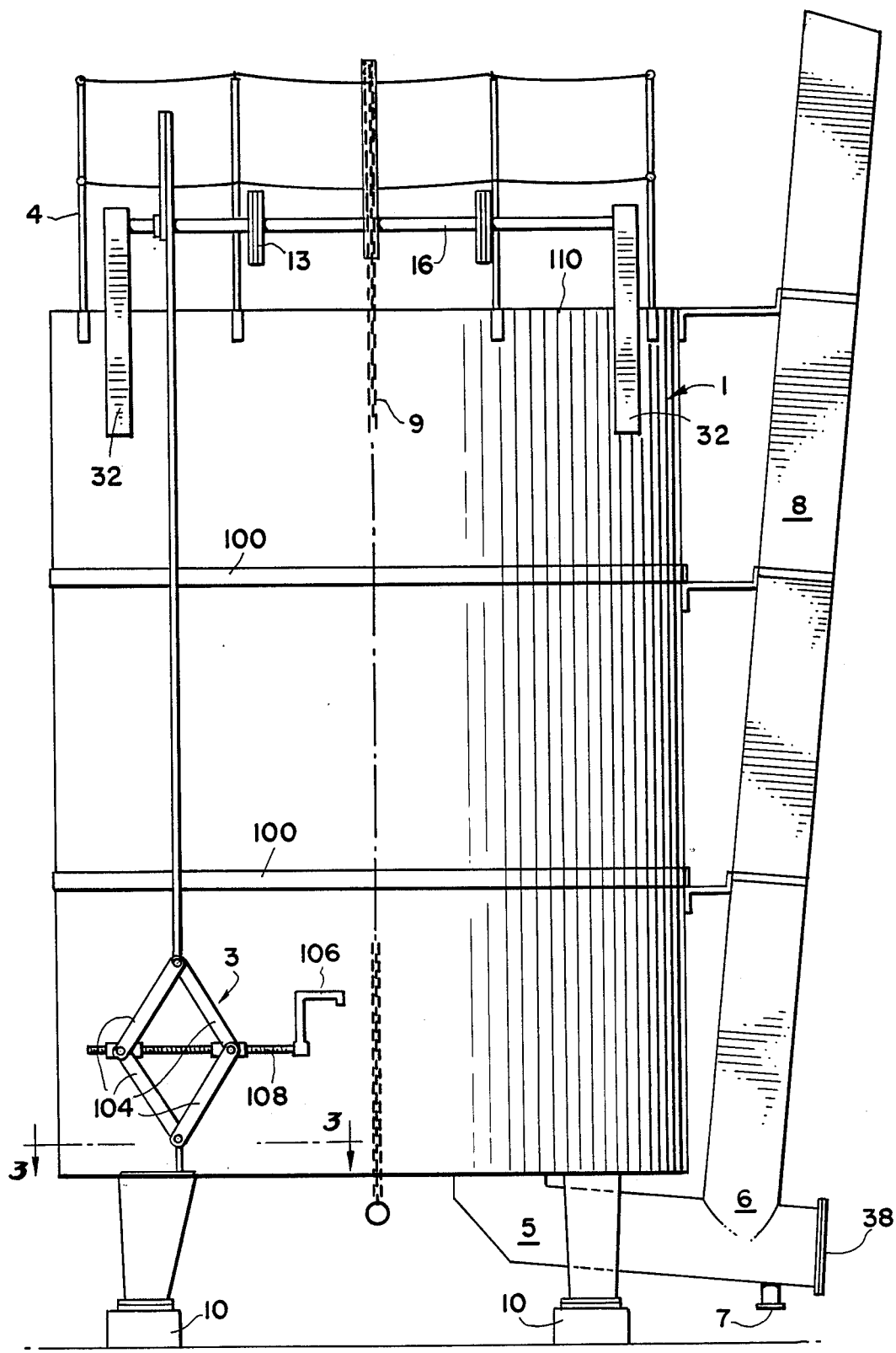
FIG. 1 is an elevation of the oven of the invention.

As can be seen in FIG. 1 there is shown an oven with 16 usable cubic meters, having major dimensions:

Height of the cylinder: 3.40 m

Interior diameter: 2.50 m

Thickness of the plates: 4 m/m

This forms a cylinder of a substantially circular cross-section. The two horizontal circular reinforcements 100 circumscribe the oven spaced from on another as can be seen; metal feet 10 support legs 2, 50 cm high, one of which is enlarged to support a control device 3. In practice supports or feet 10 are placed on a low wall or posts holding bottom 102 of the oven 1 about two meters above the ground.

Upper cover or top 110 and its axis of rotation pivot bar 16 provide a system of control from the ground effected by a crank quadrilateral 10 with a handle 106 and screwshaft 108. The details of this arrangement described below permit loading of material by operation at the group 1 level.

For discharging gases a flue is connected to bottom 102 the flue with its stack 5, the liquor outlet 7; and the vertical section 8. A tar condenser can be used in conjunction with outlet 7.

As shown in FIG. 1, a worker shield 4 is provided to protect the operator during a loading operation. FIG. 2 shows the top of the oven, which essentially consists of the cover 108 and the rotation device which opens and closes it. The crank quadrilateral 3 makes it possible to exert pressure in order to guarantee sufficient tightness on closing. The direct draft aperture (14) as shown, enables one to control the flue of air through the top 110 once arranged in a closed position. The details of the aperture operation will be described in connection with FIG. 6.

Figure 6:
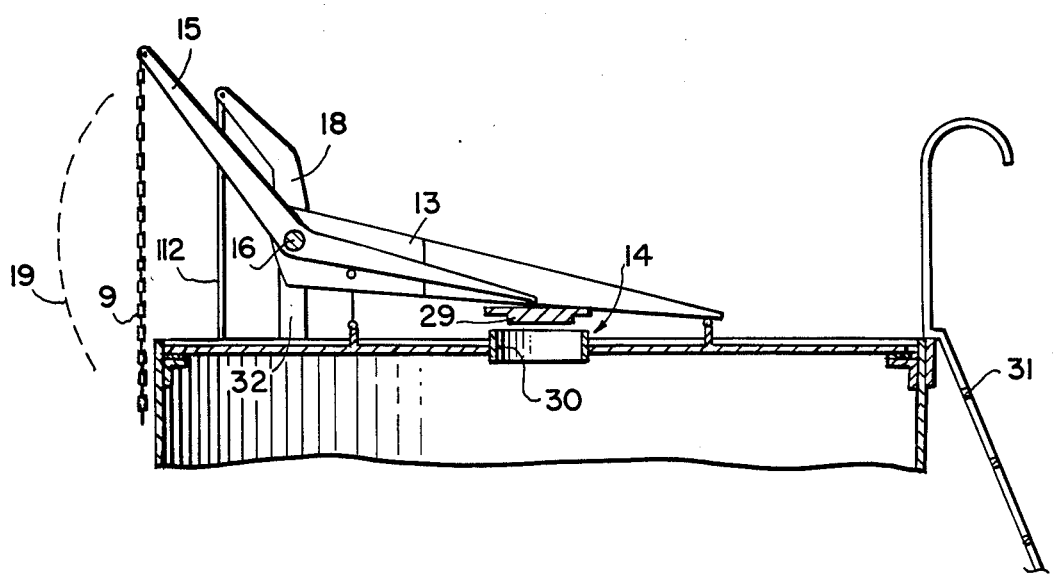
FIG. 6 is a cross-section of a top portion of the oven taken along lines 6—6.
Figure 7:
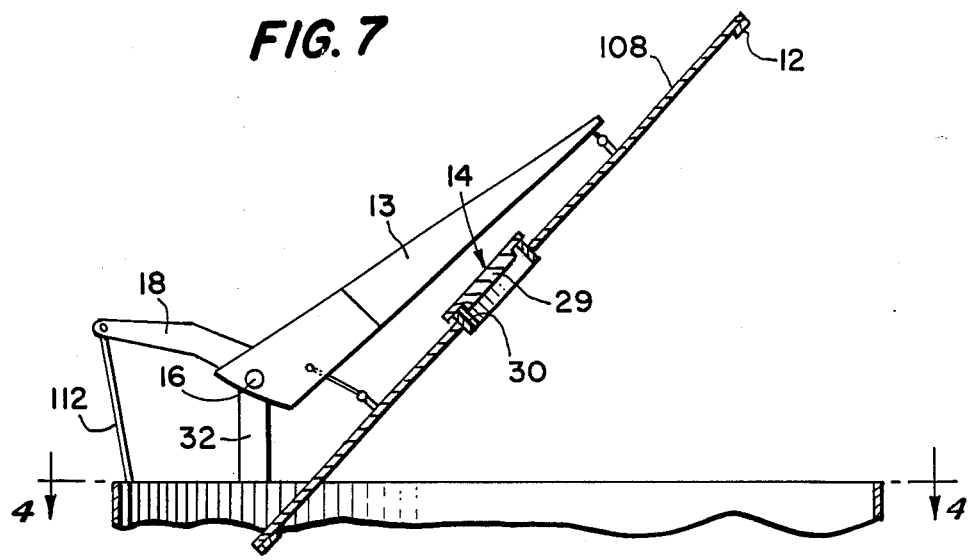
FIG. 7 is a cross-section of the top portion of the oven with the cover in an open position.

FIGS. 6 & 7 show the operation of the cover and the closing of the direct draft, as well as the connection to their controls on ground. The cover 108 fixed to bar 16 can be rotated about pivot bar 16 to open the oven and permit loading of the material to be charred. Rod 110 is connected to arm 18 which in turn is fixed to shaft 16 as can be seen in FIG. 1 and FIG. 7. The other end of rod 112 is connected to quadrilateral 3. With this arrangement rotation of handle 106 drives screw 108 and moves legs 104 to effect up or down movement of rod 112. In FIG. 6 the cover or top 110 is shown in a closed position while in FIG. 7 the cover is open. The latter position is achieved by operating the quadrilateral 3 to move the rod 112 downward which in turn causes pivot bar 116 to rotate in counter clockwise direction as shown in FIG. 7. This in turn effects a similar movement of bracket 13 to rotate cover 110 about an axis defined by pivot bar 16.

Draft aperture 14 in cover 110 includes aperture 30 located in the center of top 110 and draft plug 29 configured to seal aperture 30. Arm 15 is connected to cover 29 at one end and chain 9 at the other. Unlike bracket 13, arm 15 is not fixed to pivot bar 16, but pivots about arm 16. The operator can pull on chain 9 at ground level there through to move draft cover 29 relative to opening 30 to control the draft.

FIGS. 3 & 4 show the structure of the 3 m/m steel hearth which delineates the annular space (21) around the central opening (22) and 8 sections separated by braces welded on 3 sides. On the bottom the 8 air intake boxes 24 are clamped in place, (detail in FIGS. 8 & 9) The shaped 3 m/m steel plates with 3 cm bent returns are positioned on the vertical braces, the annular space, the boxes. They hold the load of wood, provide insulation for the lower parts and, by means of 20 m/m holes—about 60 in each plate, allow the gases to pass from the oven through the hearth.

Figure 8A:
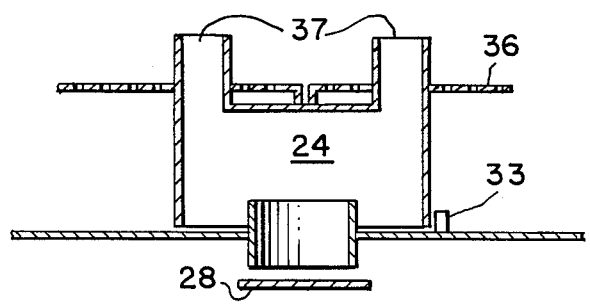
Figure 9:
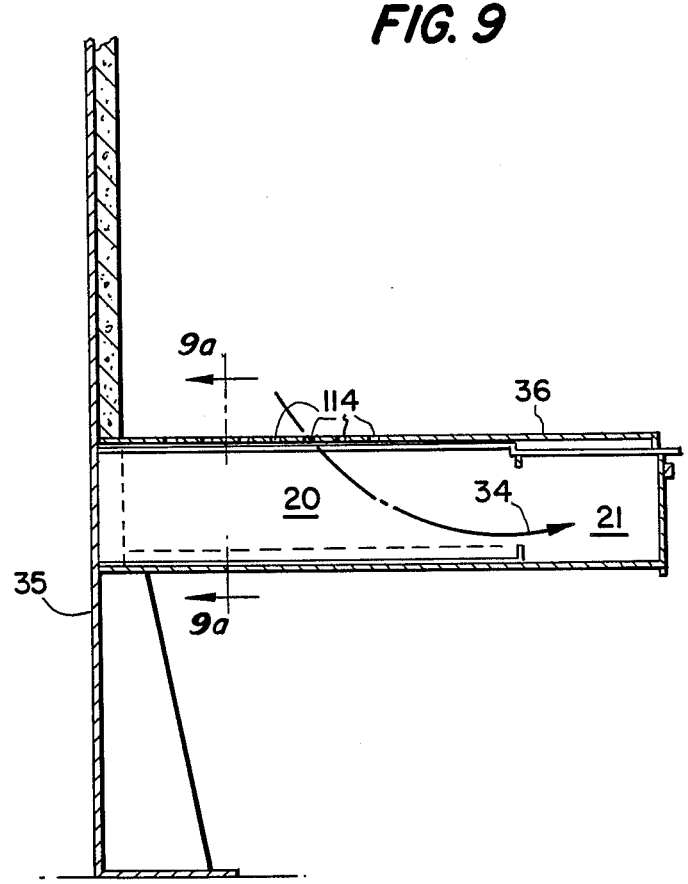
FIG. 9 is a cross section of the oven as shown in FIG. 3 taken along lines 9—9.
Figure 9A:
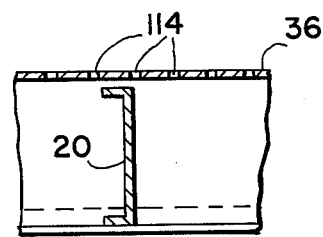

FIG. 3 & 4 show upper portion on hearth 35 and lower portion on bottom 102. Each of the air intake boxes 24 includes a cover 28 operated by a crank assembly to control the air intake o draft there through. As can be seen in FIG. 8a, air intake box 24 is configured with two spaced outlets 37 extending above the hearth floor 36 for the distribution of air in a controlled fashion. Each section of the hearth has holes 114 to permit the flow of air and gases as toward annulans space 21 as shown in FIG. 9. The opening in 22 in the hearth is closed by closure 27 the central opening 22. In this manner, once the material has been sufficiently charred, closure 27 is opened permitting the charred material to be removed by gravity beneath the oven.

Figure 5:
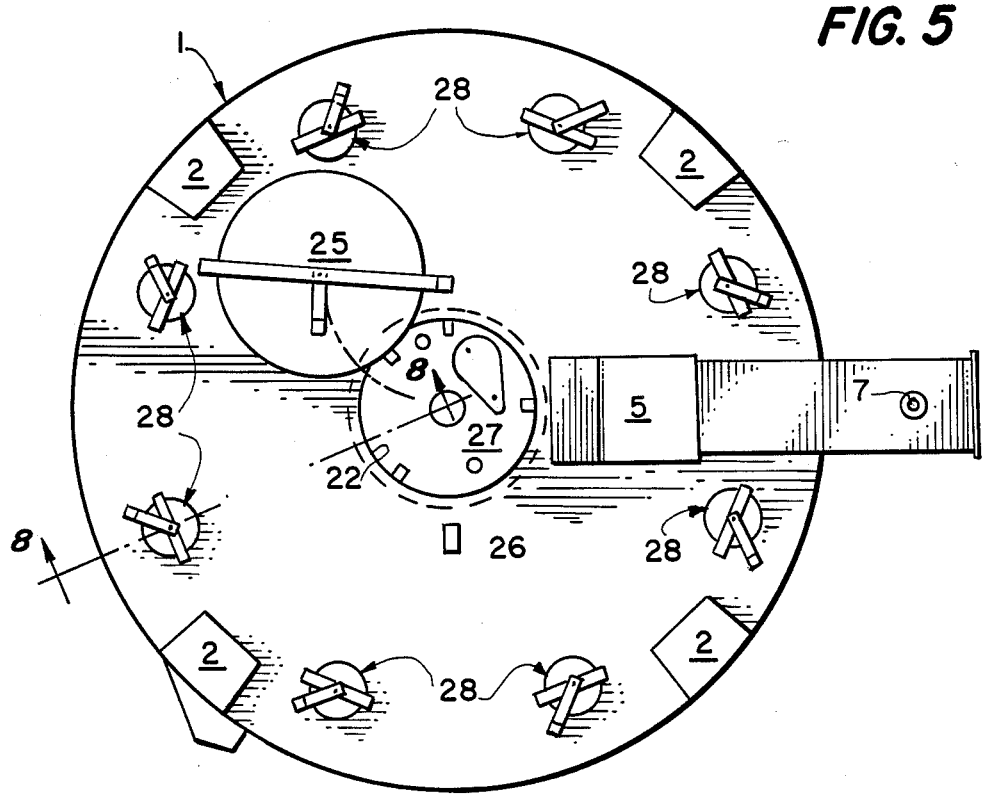
FIG. 5 is a bottom view of the oven as shown in FIG. 1.

FIG. 5 shows the bottom of the oven, the position of the flue, the 8 air intakes (28) corresponding to the 8 distribution boxes, as well as the mechanical arrangements which provide for tightly sealing the discharge opening.

As shown in FIG. 5, air tight cover 25 is in the open position exposing the interior of the oven. Cover 25 is secured to a rotating arm that permits the cover to be moved between a closed position and the open position shown. A hook 26 is provided to lock the rotating arm in place at the closed position. The mechanical cover 27 is normally coextensive with gas sector plates 36 of the hearth. This cover 27 is removable to permit discharge of the charred material by gravity. There are also lighting apertures provided to permit ignition of the wood or other material to be charred.

Figure 8:
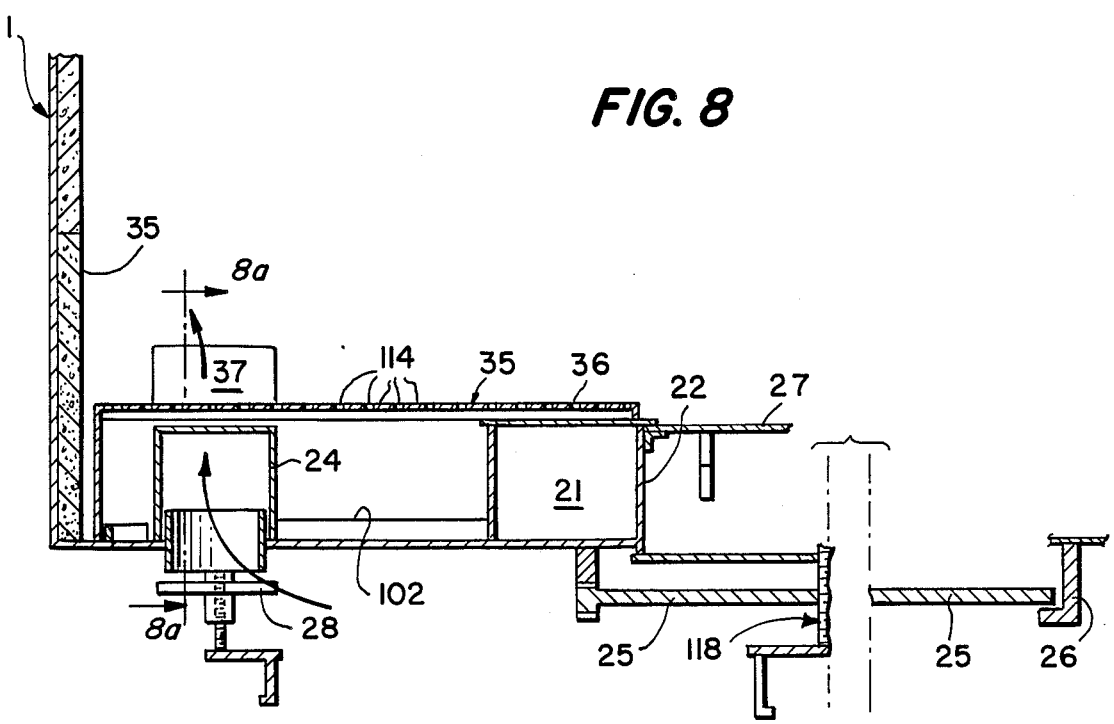
FIG. 8 is a partial cross-section of the bottom portion of the oven taken along lines 8—8 of FIG. 5.

In the cross-section of FIG. 8, the heat shield (35) is seen. It consists either of vermiculite concrete 0.05 cm thick or another insulating material of equal quality. The arrangement of the distribution boxes and the position of the plates delineate the upper part of the hearth.

In operation, the wood or other material to be charred is delivered through the top oven 1. The top is laced in an open position as shown in FIG. 7 by operation of quadrilateral crank 3. Once loaded and ignited in the conventional manner through openings in cover 27 the opening 29 is adjusted to achieve the desired draft. Similarly, the air intakes 28 are also adjusted to permit air to flow into the oven through the oven.

In this manner air is forced through the boxes 28, directed through apertures 37 for dispersion over the wood. The air and accumulated gases are then directed through gas sector grates via holes 114 into the annular space 21 for collecting gases. The gases are then exhausted through gas exhaust 5 and discharged through flue 8. Any pyroligneous liquors and other materials can be drawn off through part 7 for that purpose.

Once the wood is sufficiently charred, all parts, air intakes 28, direct draft aperature 14 are closed. After cooling the cover 25 is removed and mechanical cover displaced to permit removal of the charred wood through opening 22. The flue in this instance remains open but could include a mechanism for closing as well.

The above has been a detailed discussion of the preferred embodiment. The invention may be modified, changed or improved and still come within the scope of the invention as defined in the claims which follow. Consequently, all equivalents are intended to be covered by the claimed invention where the explicit language of the claim for whatever reason does not include the subject matter.

On site, it is recommended that these ovens be placed in line with two feet resting on a low wall about 1.5 meters high and the other two on separate concrete or steel supports.

Loading is done by lift from a roadway on the upper side of the oven; unloading into charcoal extinguishers or onto a conveyor belt at the bottom.

This simple arrangement permits rational organization and good overall operating economy of the workplace.

What is claimed:

1. An oven for charring material comprising:
   (a) a container having a top and a bottom;
   (b) a hearth for supporting the material to be charred spaced above said bottom;
   (c) said bottom having means for discharging said charred material there through;
   (d) said oven having means for admitting air through said bottom into the oven above said hearth through a path closed from space defined between said hearth and spaced bottom;
   (e) means for permitting gases to flow from above said hearth to space defined between said hearth and said bottom separate from said means for admitting air;

(f) a means for exhausting gases from the space defined between said hearth and said bottom;

(g) a flue connected to the means for exhausting gases for directing said gases away from said oven.

2. The oven according to claim 1 wherein said means for admitting air includes a number of duct means connecting to the space above said hearth, with said duct means having adjustable openings spaced about the bottom of said oven.

3. The oven according to claim 2 wherein said number of adjustable openings includes eight (8) air intake openings.

4. The oven according to claim 2 wherein each air intake opening includes a cover movable between an open position and a closed position.

5. The oven according to claim 4 wherein said means for admitting air further comprises an air intake box connecting in said closed path each opening with apertures extending above the hearth to distribute the air drawn there through across the hearth of the oven.

6. The oven according to claim 5 wherein eight (8) openings are equally spaced about the circumference of the bottom of the oven, and eight (8) boxes are arranged wherein each box communicates in a closed path between its respective opening and two (2) apertures extending into the oven above the hearth.

7. The oven according to claim 6 further comprising a crank and screw assembly for moving said cover between said open and closed position.

8. The oven according to claim 1 wherein said means for exhausting gases include a number of holes in the hearth to communicate the gases in the portion of the oven above the hearth to the space between the hearth and the bottom of the oven.

9. The oven according to claim 8 further comprising an annular of space for collecting gases, said annular of space being arranged in the space between the hearth and the bottom of the oven about a central portion of the oven, an exhaust duct being arranged in communication with said annular of space for exhausting the gases from the oven to a position remote from the oven.

10. The oven according to claim 9 wherein said means for discharging the material charred includes an opening in the bottom of said oven, and a cover movable between an open position for permitting discharge of material and a closed position for securing said material within the oven.

11. The oven according to claim 10 wherein said cover is rotatable about an axis between said open and closed-position and is adjustable to seal the opening.

12. The oven according to claim 11 further comprising a hearth cover movable between an open and closed position to provide access to the portion of the oven above the hearth for removal of the material to be charred.

13. The oven according to claim 12 wherein the space between the hearth and the bottom of the oven is not greater than one-fourth of the length of the entire container.

14. The oven according to claim 13 wherein the distance between the hearth and the bottom of the oven is about 23 cm.

15. An oven of cylindrical configuration for charring materials comprising:

(a) a bottom and a top, said top being movable between an open position for receiving the material to be charred and a closed position for sealing the oven during operation;

(b) means for moving said top between said open and closed positions are operable from a position adjacent the bottom of the oven, said means for moving said top including a pivot bar, arms fixed to set pivot bar and connected to said top, and actuating means for pivoting pivot bar between the open and closed positions;

(c) said hearth being displaced from the bottom of said oven no more than about one-fourth of the length of the container, a number of air intake openings being arranged in the bottom of the oven to admit air for combustion, said openings being adjustable between an open and closed position, an air intake box connecting said openings to apertures in or above the hearth and defining a closed path between the openings and the apertures;

(d) said hearth defining a center portion opening, a removable cover for movement between a closed position for closing said opening and a open position for gaining access to the portion of the oven above the hearth, an annular space being defined about said center portion in the space between the hearth and the bottom of the oven, an exhaust duct in communication with said annular of space; and (e) a bottom opening in the bottom of said oven communicating with said center portion for exposing said hearth cover, said bottom opening being covered by removable cover which can be moved from an open position for permitting discharge of the material and a closed position for sealing the opening.

16. The oven according to claim 15 further comprising at least eight (8) air-intake openings equally spaced about the bottom of said oven, and eight (8) air-intake boxes each providing a closed path between its respective air-intake opening and two (2) apertures extending into the portion of the oven above the hearth, means for directing gases in the oven above the hearth into the annular space between the hearth and the bottom of the oven.

17. The oven according to claim 16 wherein said top further comprises a direct draft aperture, a movable plug movable between an open and closed position for controlling the air flow through said aperture, and means for actuating said plug at a position adjacent the bottom said oven.

* * * * *